United States Patent Office 2,754,684
Patented July 17, 1956

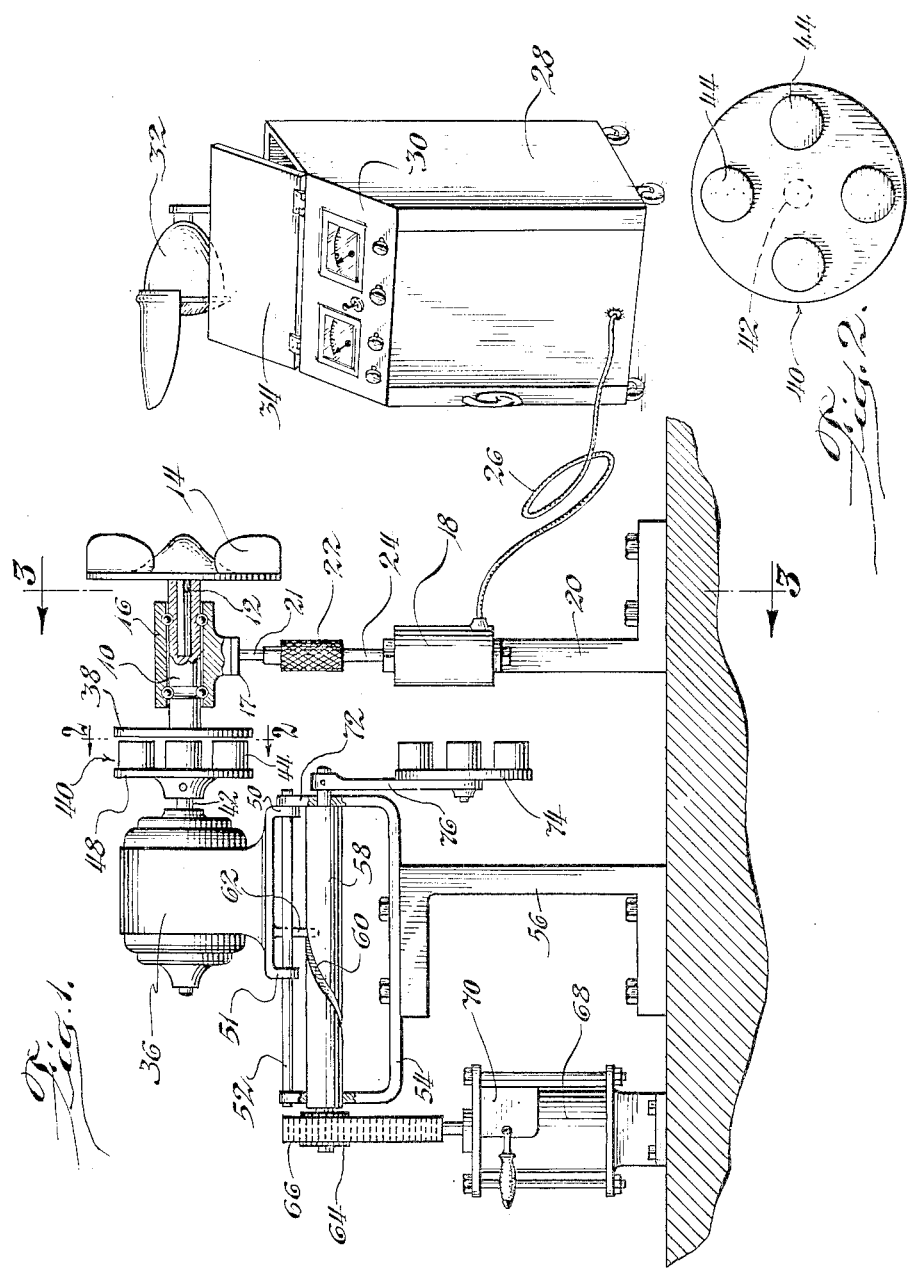

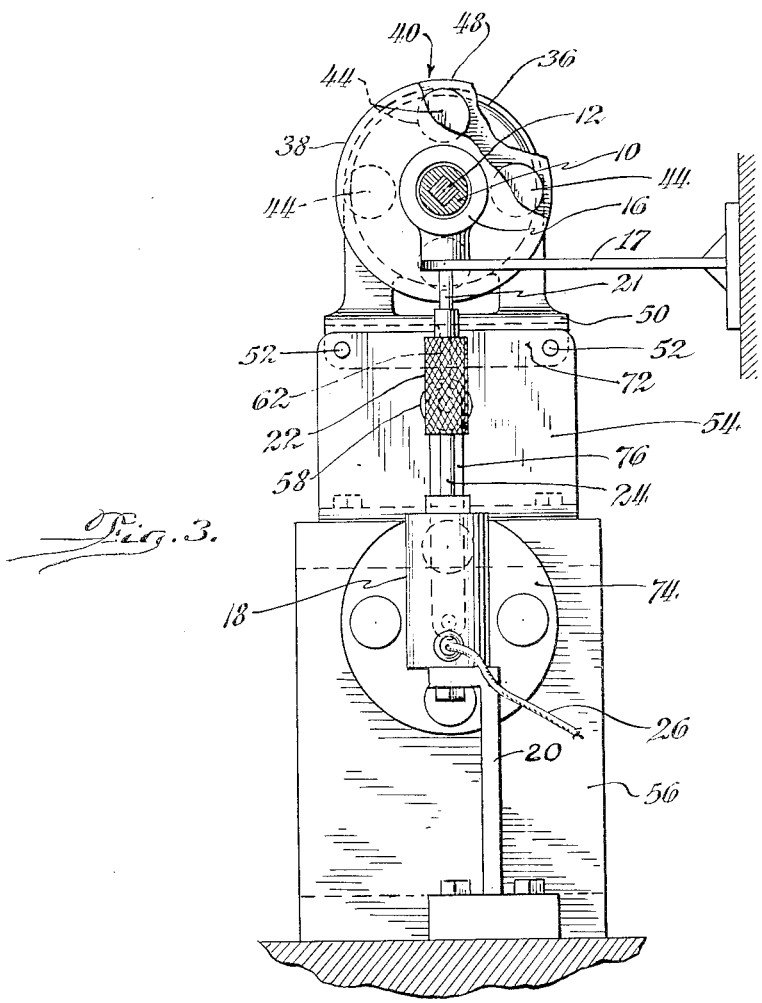

2,754,684

APPARATUS FOR DETERMINING UNBALANCE IN ROTARY BODIES

David C. Peterson, Chicago, Ill., assignor to Stewart-Warner Corporation, Chicago, Ill., a corporation of Virginia Application August 20, 1953, Serial No. 375,466

6 Claims. (Cl. 73—466)

The present invention relates to apparatus for determining unbalance in rotary bodies. In the use of such apparatus, the part to be checked is placed in a holder and then rotated at a rather high speed while its state of unbalance is determined by means such as that disclosed in Mesa Patent 2,616,288.

One object of the invention is to provide improved, high production, unbalance determining apparatus having novel means for quickly and smoothly accelerating a rotary part to unbalance checking speed and then quickly braking it to a stop.

Another object is to provide highly efficient apparatus of the above character having improved means for driving a rotary body without restricting vibratory movement thereof caused by its unbalance.

A more specific object is to provide unbalance determining apparatus having improved rotary drive means and braking means which alternately are brought properly into operation by a common control mechanism well suited for power operation.

Other objects and advantages will become apparent from the following description of the form of the invention shown in a drawing, in which:

Fig. 1 is a side view of apparatus incorporating the invention.

Fig. 2 is a fragmentary view taken along the line 2—2 of Fig. 1 and showing the face of a rotary drive element; and Fig. 3 is an end view taken along the line 3—3 of Fig. 1.

The balancing apparatus incorporating the illustrated form of the invention comprises a horizontal shaft 10, one end of which is formed as a collet to receive the spindle 12 of a rotary part 14 which is to be checked for unbalance. The shaft is journaled in a support bearing 16 fixed to a suitably mounted leaf spring 17. A vibration pickup device 18 is suitably mounted upon a pedestal 20. Vibration from the bearing 16 is transmitted to the pickup through a rod 21 which is connected to the spring 17, a viscous liquid slip coupling member 22 and a second rod 24. The pickup 18 may be of any suitable type, such as shown, for example, in the previously mentioned Mesa Patent No. 2,616,288, and the coupling 22 may be of the type shown in the copending application of Arthur C. Allen, Serial No. 748,049, now Patent No. 2,656,713.

The pickup unit 18 is connected by a flexible cord 26 to electrical unbalance detecting means mounted in a wheeled cabinet 28. A full description of suitable electrical means of this character may be found in the previously mentioned patent, No. 2,616,288. It will be noted, however, that the cabinet 28 includes a control panel 30 in full view of the operator. A stroboscopic light 32 mounted on top of the cabinet is designed to shine directly on the part 14 when the cabinet is positioned generally under the extended axis of the shaft 10. A hinged mirror 34 allows the operator to view markings on the body 14 from a control station on the near side of the apparatus.

Once the part 14 has been mounted in the holder 10, it is smoothly accelerated from rest up to unbalance detecting speed by a rotary drive energized by a constant speed electric motor 36. The rotary drive comprises an eddy current driven disc 38 fixed to the end of the shaft 10. This disc is made of a good conductor and is driven by a magnetic drive assembly 40 mounted on the motor shaft 42 and adapted to produce a magnetic field that extends outwardly in the direction of the disc.

Although the magnetic driver 40 may be of any suitable construction, for purposes of illustration it is shown as being formed of a plurality of bar-like permanent magnets 44 (Fig. 2) suitably secured to a disc 48 of magnet material and presenting poles successively of opposite polarity close to the disc 38.

When rotated by the motor 36 in proximity to the eddy current disc 38, the magnetic drive assembly 40 produces a torque reaction on the eddy disc, smoothly accelerating it to a speed approaching that of the motor.

The rotary drive is conveniently controlled by moving the magnetic drive assembly 40 into and out of proximity to the eddy disc 38. For this purpose the motor 36, which carries the magnetic drive assembly 40, is mounted on suitable guide means for movement toward and away from the driven disc 38. As shown, two downwardly turned flanges 50, 51 on the forward and rear edges of the motor base are apertured to receive two laterally spaced, horizontal guide rods 52 supported at opposite ends in a U-shaped bracket 54 secured to a suitable mount 56.

Advancement and retraction of the motor 36 to move the magnetic driver 40 into and out of proximity to the disc 38 is effected by an operating mechanism including a horizontal grooved shaft or cam cylinder 58 mounted in the bracket 54 just below the motor support rods 52. A helical cam groove 60 formed in the cylindrical surface of the shaft 58 receives a follower 62 extending downwardly from the overlying base of the motor 36, whereby the motor 36 may be reciprocated by rotation of the cam 58 alternately in opposite directions through an angle of about 180°.

A pinion 64 mounted on the end of the shaft more remote from the disc 38 meshes with a vertical rack 66 connected at its lower end with a piston (not shown) slidable within an air cylinder 68. The reciprocation movement of the rack 66, and hence rotation of the shaft 58, is controlled by a manually actuated air valve 70 for the cylinder 68.

Advancement of the motor 36 toward the driver disc 38 is terminated by engagement of the motor base flange 50 with the forward leg 72 of the bracket 54, thus positioning the magnetic driver 40 in properly spaced relation to the disc 38 for smooth acceleration of the latter.

Upon retraction of the motor 36, separating the magnetic driver 40 from effective driving connection with the disc 38, the holder 10 is smoothly braked to a stop by a brake element 74. The brake element, which is similar in construction to the driver 40, is mounted on the free end of a radial arm 76 fixed to the forward end of the cam or shaft 58. Rotation of the control shaft to retract the motor 36 swings the arm 76 upwardly through an arc of approximately 180° to position the brake element 74 in closely spaced, opposed relation to the disc 38. Still spinning, the disc is smoothly checked in speed by the magnetic reaction of the magnetic fields of the brake element 74 with the magnetic fields resulting from eddy currents induced in the disc 38.

The means thus provided for smoothly accelerating the part 14 to balance determining speed and then rapidly decelerating it to a halt is quite simple and durable in construction. Not only are the accelerating torque and braking torque applied without shock, but the whole operation is carried out without wear on either the driving or braking means.

Having no mechanical connection to the driven disc 38, the magnetic driver 40 permits substantially free vertical vibration of the elements supported by the spring 17. As herein disclosed, the permanent magnets 44 are preferably mounted on the drive disc 48 and on the brake disc 74 so that the driven disc 38, which must be accelerated to high speed and braked to a stop during each testing operation, may be light in weight and have a low rotary moment of inertia. The use of a constant speed motor 36 eliminates the need for motor speed controls. Alternate positioning of the driving disc and the braking disc for effective coaction with the driven disc 38 is provided for by the common power control mechanism which affords positive assurance against the simultaneous application of driving and braking forces to the holder. The time taken for determining the angular position and degree of unbalance of parts is greatly reduced because the apparatus is so easily controlled to produce rapid acceleration and deceleration of the parts being tested.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantialy the results of my invention may be obtained through the use of substantially the same or equivalent means.

I claim:

1. In an apparatus for determining unbalance in a part, the combination of a rotary holder for the part; a magnetic drive for rotating said holder and comprising a first drive member including means for creating a magnetic field extending externally of the member, and a second member capable of creating a torque reaction on the first member when rotated relative thereto in the proximity thereof, one of said members being connected to said rotary holder; a constant speed power source connected to the other of said members; a brake element generally similar to said other drive member, and control means for shifting said other drive member and said brake element alternately into and out of proximity to said one drive member to smoothly accelerate and decelerate said holder.

2. In an apparatus for determining unbalance in a rotary part, the combination of a rotary holder for the part, a movable support for said holder, a power source, a magnetic drive for rotating said holder from said power source without any mechanical connection therebetween, said drive comprising an eddy current disc connected to said holder and a magnetic member connected to said power source, a brake member similar to said magnetic member, and means for bringing said drive member and said brake member alternately into and out of the proximity of said eddy current disc.

3. Unbalance determining apparatus comprising, in combination, a support for supporting for free rotation thereon a body to be checked for unbalance, means mounting said support for vibratory movement; a magnetic drive including means adapted to be connected to a body to be rotated in said support and having a first member thereof, and a second member capable of creating a torque reaction on said first member when rotated relative thereto in the proximity thereof; a vibration pickup connected to said support to sense vibration thereof by a rotary body supported thereon, unbalance detecting means connected to said pickup to respond thereto, a power source connected to said second drive member, guide means supporting said power source and said second drive member for movement generally along the axis of rotation of said first drive member, control means for moving said power source and said second drive member along said guide means into and out of proximity to said first drive member, said control means including a rotary member having a radial arm thereon, and a brake element similar to said second drive member mounted on said arm and movable thereby into and out of proximate braking relation to said first drive member as an incident to movement of said second drive member away from and toward said first drive member.

4. Unbalance determining apparatus comprising, in combination, a support for supporting for free rotation thereon a body to be checked for unbalance, means mounting said support for vibratory movement; a magnetic drive including means adapted to be connected to a body to be rotated on said support and having a first member thereon and a second member capable of exerting a torque reaction on the first member when rotated relative thereto in the proximity thereof; a power source connected to said second member, a brake element generally similar to said second drive member, common control means interconnected with both said second drive member and said brake element for moving the two alternately into and out of proximity to said first drive member to apply rotating and braking forces thereto, and power means connected to said control mechanism to actuate the latter.

5. In unbalance determining apparatus, the combination of a rotary holder for bodies to be checked for unbalance, a magnetic holder drive including an eddy disc connected to said holder and a magnetic disc capable of producing a torque reaction on said eddy disc when rotated relative thereto in the proximity thereof, a power source connected to said magnetic disc, guide means supporting said magnetic disc for movement toward and away from said eddy disc, control means for moving said magnetic disc into and out of proximity to said eddy disc and including an elongated rotary member having a helical cam thereon and a cam follower coacting with said cam and interconnected with said magnetic disc, and means for rotating said elongated control member.

6. In apparatus for determining unbalance in a rotary body, the combination of a support for supporting for rotation thereon a body to be checked for unbalance, means mounting said support for vibratory movement, a power source, a magnetic drive for rotating a body on said support from said power source, said drive comprising an eddy current disc and means thereon for connecting the disc with a body to be rotated on said support and a magnetic member connected to said power source, a brake member similar to said magnetic member, and means for bringing said drive member and said brake member alternately into and out of proximity to said eddy current disc when the latter is drivingly connected to a body rotatably mounted on said support.

References Cited in the file of this patent

UNITED STATES PATENTS

| | | |
|---|---|---|
| 1,546,030 | Schmidt | July 14, 1925 |
| 2,092,096 | Swedlund | Sept. 7, 1937 |